(12) United States Patent
Hall et al.

(10) Patent No.: US 7,236,742 B2
(45) Date of Patent: Jun. 26, 2007

(54) SYSTEM AND METHOD FOR WIRELESS DATA TRANSFER FOR A MOBILE UNIT

(75) Inventors: Eric S. Hall, Provo, UT (US); David K. Vawdrey, South Jordan, UT (US); Charles D. Knutson, Salem, UT (US)

(73) Assignee: Brigham Young University, Provo, UT (US)

( * ) Notice: Subject to any disclaimer, the term of this patent is extended or adjusted under 35 U.S.C. 154(b) by 425 days.

(21) Appl. No.: 10/174,764

(22) Filed: Jun. 18, 2002

(65) Prior Publication Data
US 2004/0203352 A1    Oct. 14, 2004

(51) Int. Cl.
   *H04B 7/00* (2006.01)
(52) U.S. Cl. ............... 455/41.3; 455/41.2; 340/10.33; 340/572.1
(58) Field of Classification Search ............. 455/41.2, 455/41.3, 574, 343.2, 343.3; 340/10.33, 340/572.9
See application file for complete search history.

(56) References Cited

U.S. PATENT DOCUMENTS

| | | | |
|---|---|---|---|
| 5,477,215 A * | 12/1995 | Mandelbaum | 340/5.61 |
| 6,331,972 B1 | 12/2001 | Harris et al. | |
| 6,480,101 B1 * | 11/2002 | Kelly et al. | 340/10.2 |
| 6,525,648 B1 * | 2/2003 | Kubler et al. | 340/10.33 |
| 6,593,845 B1 * | 7/2003 | Friedman et al. | 340/10.33 |
| 6,600,905 B2 * | 7/2003 | Greeff et al. | 455/106 |
| 2001/0007815 A1 | 7/2001 | Philipsson | |

OTHER PUBLICATIONS

Low Power Rendezvous in Embedded Wireless Networks, Terry Todd, Frazer Bennett and Alan Jones.
Low Power Rendezvous and RFID Wakeup for Embedded Wireless Networks, Milan Nosovic and Terry Todd.
Radio Frequency Identification RFID, A basic primer, The Association of the Automatic Identification and Data Capture Industry.

\* cited by examiner

*Primary Examiner*—Sanh D. Phu
(74) *Attorney, Agent, or Firm*—Thorpe North & Western LLP

(57) ABSTRACT

A mobile communication device is provided for wirelessly transferring information to and from a base unit. The device comprises an RFID module to receive a wake-up communication from the base unit and to send connection parameters back to the base unit. A wireless communication module is included that is responsive to the connection parameters received from the base unit. A microcontroller is coupled between the RFID module and the wireless communication module to wake-up the wireless communication module when the RFID module receives the wake-up communication from the base unit.

23 Claims, 6 Drawing Sheets

SYSTEM AND METHOD FOR WIRELESS DATA TRANSFER FOR A MOBILE UNIT

FIELD OF THE INVENTION

This invention relates generally to the wireless transfer of information between communication devices.

BACKGROUND

The transfer of information between electronic devices is now an important activity in everyday life. Often electronic information transfers occur via wired communication links involving networks that require substantial set-up and/or installation costs. Problems occur when information needs to be transferred between mobile devices because wired connections are cumbersome and tend to negate the usefulness and mobility of the devices.

There are methods and devices that facilitate wireless information transfer, but most conventional wireless networks do little more than replace wire lines with wireless communication links. A significant amount of infrastructure and user involvement in setup procedures is still common.

Certain mobile communication devices reduce the infrastructure problem by facilitating information transfer with widely accepted protocols and avoiding the need for wired networks. These devices, such as PDAs, digital cameras, cell phones, and other mobile devices, are effective in situations where information needs to be transferred between mobile devices not normally connected to networks. However, one problem with these larger devices is that they are generally too large to be carried around by a person and stored compactly in a wallet, slipped into a small purse, tucked in a pocket, or carried in some other manner on a person. This is due in part to the relatively large batteries that are needed to power cell phones, PDAs, and similar mobile devices.

As society becomes more information dependent, individuals carry an increasing amount of information on their person. In the past, the information has been encoded onto physical devices or cards that are then tucked inside a wallet or a purse or simply carried in a pocket. A multitude of cards or devices are inconvenient because in order for the information encoded devices and cards to be useful, the individual must physically carry them around anticipating their use. Eventually, the wallet, pocket, or purse gets bulky when carrying everything one might anticipate using. When the cards and devices are used they must be physically removed, as from the wallet, and then returned upon completion of the transaction.

By digitizing the information contained on the encoded devices and selectively transferring the information over a wireless link via a PDA-sized mobile communication device, these problems are partially solved. But a new problem is created because the information is merely transferred from the bulky devices or cards to a bulky PDA-sized device that facilitates the information transfer. PDAs and similar devices are sometimes too big to be conveniently carried, imposing an additional burden on the individual.

Smart card technology accommodates the size restrictions of storing information on a device which is easily carried. A smart card is generally a credit-card sized device with an embedded computer chip. The chip can either be a microprocessor with internal memory or a memory chip with non-programmable logic. A smart card generally has no user interface and the card is generally powered from an external source. Typically, a smart card is inserted into another device that allows a user to enter and retrieve information from the card. Thus, a smart card is usually physically docked with another read/write device to transfer information. Some smart cards can facilitate information transfer without direct physical contact with another device. These cards rely on a contactless electromagnetic interface to transfer information. The disadvantage of this system is limited range—usually 25 centimeters or less. Often it is not feasible or convenient to transfer information from a device within a range of just a few centimeters, especially if the device is located within a wallet or a purse.

Certain mobile communication devices assist in transferring information from smart cards at distances greater than a few centimeters. These devices allow the information on the card to be securely transferred in environments with a large number of communication devices. For example, information can be wirelessly transferred in a Point-of-Sale transaction, or other similar transactions where the information is personal and/or restricted in some way. The devices may include the smart card interface, a keypad, a display, a radio, an antenna, and a battery. A smart card is connected to these communication devices (e.g., a PDA), which facilitate the transfer of the information contained on the card. However, these devices are also bulky and do not fit inside a wallet. Like the devices above, these devices are also cumbersome and difficult to carry.

Some mobile devices make use of an embedded Bluetooth radio to facilitate the transfer of information. Bluetooth is a technology based on a short-range radio link that facilitates protected, ad-hoc connections for stationary and mobile communication units in Wireless Personal Area Network (WPAN) environments. Bluetooth technology allows for communication links connecting mobile communication devices over a range of 10 centimeters to 100 meters. Further, Bluetooth technology is designed to operate in a noisy radio frequency environment, and uses a frequency-hopping scheme to make the communication link robust.

One disadvantage of certain wireless communication technologies (such as Bluetooth) is the amount of time required to discover and fully connect with other mobile communication devices. Setting up a connection using Bluetooth takes ten seconds or even longer when the ideal conditions are not present. Long connect times (e.g., ten seconds) may be unacceptable in emergency communication situations, with multiple device interactions, or in circumstances in which two mobile devices may quickly pass out of range. Suppose communication is intended between two mobile devices approaching one another from opposite directions. Although communication may be intended, the devices may cross paths and be out of range before the device discovery process is complete.

Another significant problem with mobile wireless communication devices is power consumption. Mobility in portable devices is directly linked to the life of the battery power supply. Because of size and weight restrictions associated with mobile devices, limiting power consumption is a high priority. Reducing power consumption is important in devices that utilize wireless communication technologies, such as Bluetooth. As an example, in Bluetooth active mode, data transmission consumes a large amount of power. Even in idle or standby mode, Bluetooth modules and comparable modules consume power responding to discovery inquiries from other wireless devices that enter the WPAN space.

SUMMARY

The invention provides a mobile communication device for wirelessly transferring information to and from a base unit. The device comprises an RFID module to receive a wake-up communication from the base unit and to send connection parameters back to the base unit. A wireless communication module is included that is responsive to the connection parameters received from the base unit. A microcontroller is coupled between the RFID module and the wireless communication module to wake-up the wireless communication module when the RFID module receives the wake-up communication from the base unit.

Additional features and advantages of the invention will be apparent from the detailed description which follows, taken in conjunction with the accompanying drawings, which together illustrate, by way of example, features of the invention.

DETAILED DESCRIPTION

Figure 1:
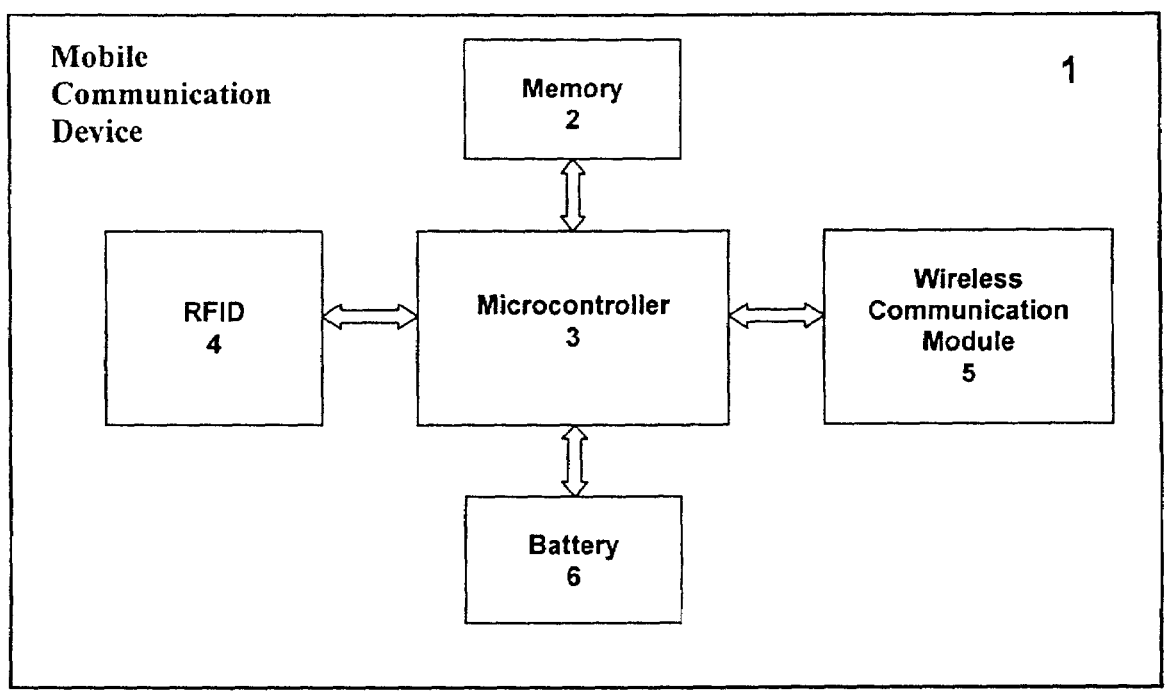
FIG. 1 is a block diagram of mobile communication device according to an embodiment of the invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The present invention is a system and method that combines wireless communication technology and Radio Frequency Identification Technology (RFID) for allowing a reduced sized mobile communication device to conform to use in a wallet, facilitating the storage and transfer of information typically carried on one's person, minimizing communication link connection time, and maximizing battery life. One embodiment of the invention uses a credit-card sized configuration to allow users to carry the device more easily. Of course, the device may be smaller as electronic miniaturization and cost constraints allow.

The battery powered wireless device of the present invention is desired to be configured to use as little power as possible so the smallest battery can be used. This power conservation allows a device user to carry it for months or years at a time without changing or recharging batteries. The present invention aids in solving both the problems of lengthy discovery time between wireless communication devices and wasteful power consumption. These problems are mitigated with the aid of low power management facilitated by passive Radio Frequency Identification (RFID) technology.

An RFID transponder can be either an active powered device with its own battery or a passive device that is powered from an external source. A passive RFID device is a battery-free, data storage device that reacts to a reader or interrogator produced signal. Having no internal power source, passive transponders derive the power they require to respond from the reader or interrogator's electromagnetic field. The connection may be an inductively coupled or radiated electromagnetic field that triggers a data modulated radio frequency response. Combining RFID and wireless communication technology into a single mobile communication device helps overcome the burdens normally associated with power consumption.

The system of the present invention works in the following manner. Initially, an RFID module or tag receives a signal from another RFID transceiver at a distance of about 1 to 100 meters. This signal is used as a cue to "wake-up" and/or enable a sleeping wireless communication module or radio. In addition, the RFID tag responds with connection information allowing the communication module to bypass the at least 10 second inquiry or discovery period. After a connection is made, relevant data can be exchanged between the devices or downloaded from the mobile wireless device. When RFID signals cease or when the communication is complete, the mobile wireless communication device returns to hardware shutdown or software standby mode where it consumes virtually no power. This combination of the RFID and the wireless communication module limits the power used by the wireless communication module. The reduced power requirements of this system allow it to be implemented as a credit-card or smaller sized device which may last a number of years using a battery that will fit within the device. The size of this device is especially convenient when implemented in credit-card sized mobile communication devices with a relatively small battery.

FIG. 1 illustrates a block diagram of a mobile communication device 1 according to an embodiment of the invention. The mobile communication device can be a credit-card sized unit or a smaller device as the specifications of the application dictate. The device can store information selected to be carried on an individual's person in a user-programmable memory 2. The information is accessed and processed from the memory or EEPROM via a microcontroller 3 that is also connected to an RFID module 4 or RFID tag. The microcontroller is also coupled to a wireless communication module 5, such as a Bluetooth wireless radio, an Ultra Wideband (UWB) radio, an 802.11 (Wi-Fi) radio, or an IrDA communication module. The mobile device is powered by an internal battery 6, which is of a type that powers wireless devices effectively as known by those skilled in the art. The RFID module can be passive in order to save power or the RFID can be active and connected to a power source.

Figure 2:
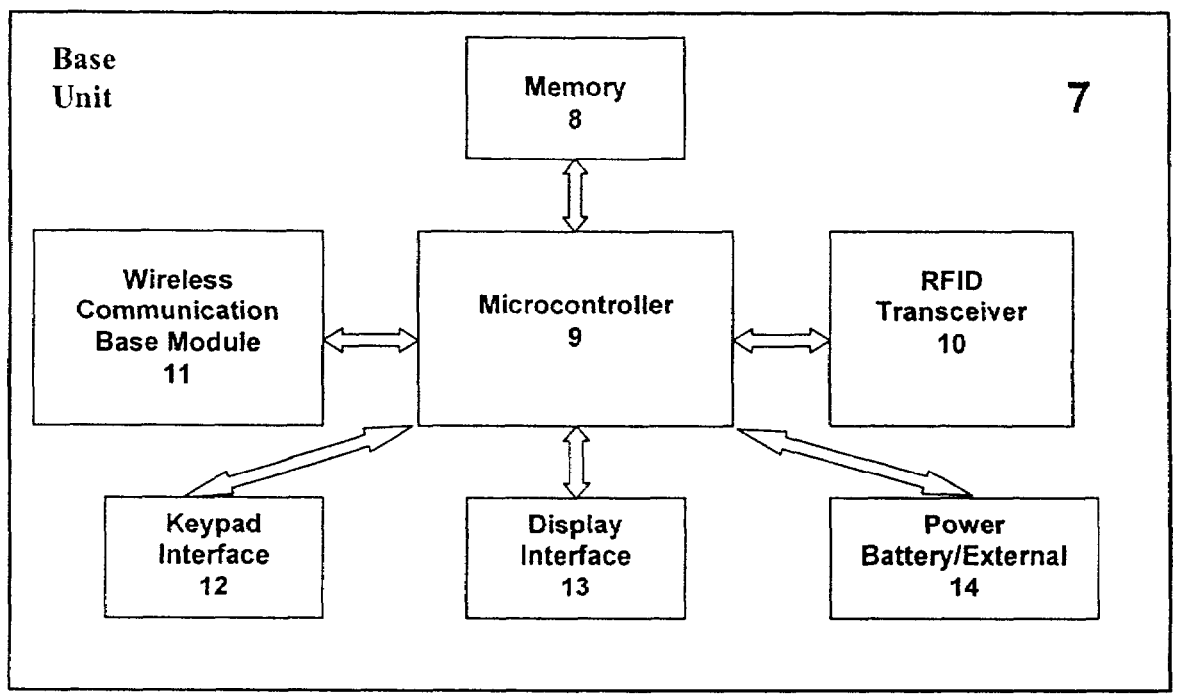
FIG. 2 is a block diagram of a first embodiment of a handheld, desktop, or base unit according to an embodiment of the invention.

One embodiment of a handheld device, desktop unit, or base unit 7 comprises the elements illustrated in the block diagram of FIG. 2. Accordingly, the unit contains a microcontroller 9 that is connected to the internal memory 8 or EEPROM, an RFID transceiver 10, a wireless communication base module 11, a keypad interface 12, and a display interface 13. The base unit is powered either by an internal battery 14 or an external power-source. A records database 15 (FIG. 3) is either stored directly in an internal memory 8 or accessed via a separate network connection. The base unit is used to transfer information to and/or from the records database 15, and communicates with the mobile communication device 1 via the method and system outlined in FIGS. 3 and 4.

Figure 3:
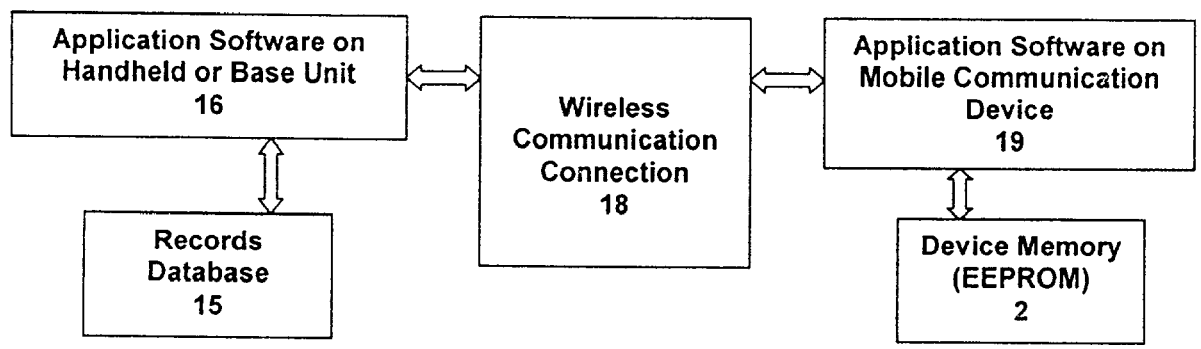
FIG. 3 is a block diagram of the method and system for transferring information by establishing a wireless communication link.

FIG. 3 is a block diagram of a system and method to illustrate the transfer of information by establishing a wireless communication link. All the information transactions of the present invention are generally controlled by the application software 16 on the handheld, desktop, or base unit. Wireless communication 18 facilitates the transfer of information to or from the device memory 2 of the mobile communication device via application software 19 for the device. Information can also be transferred to or from the records database 15 on the handheld, desktop, or base unit via application software 16 on the base unit.

Figure 4:
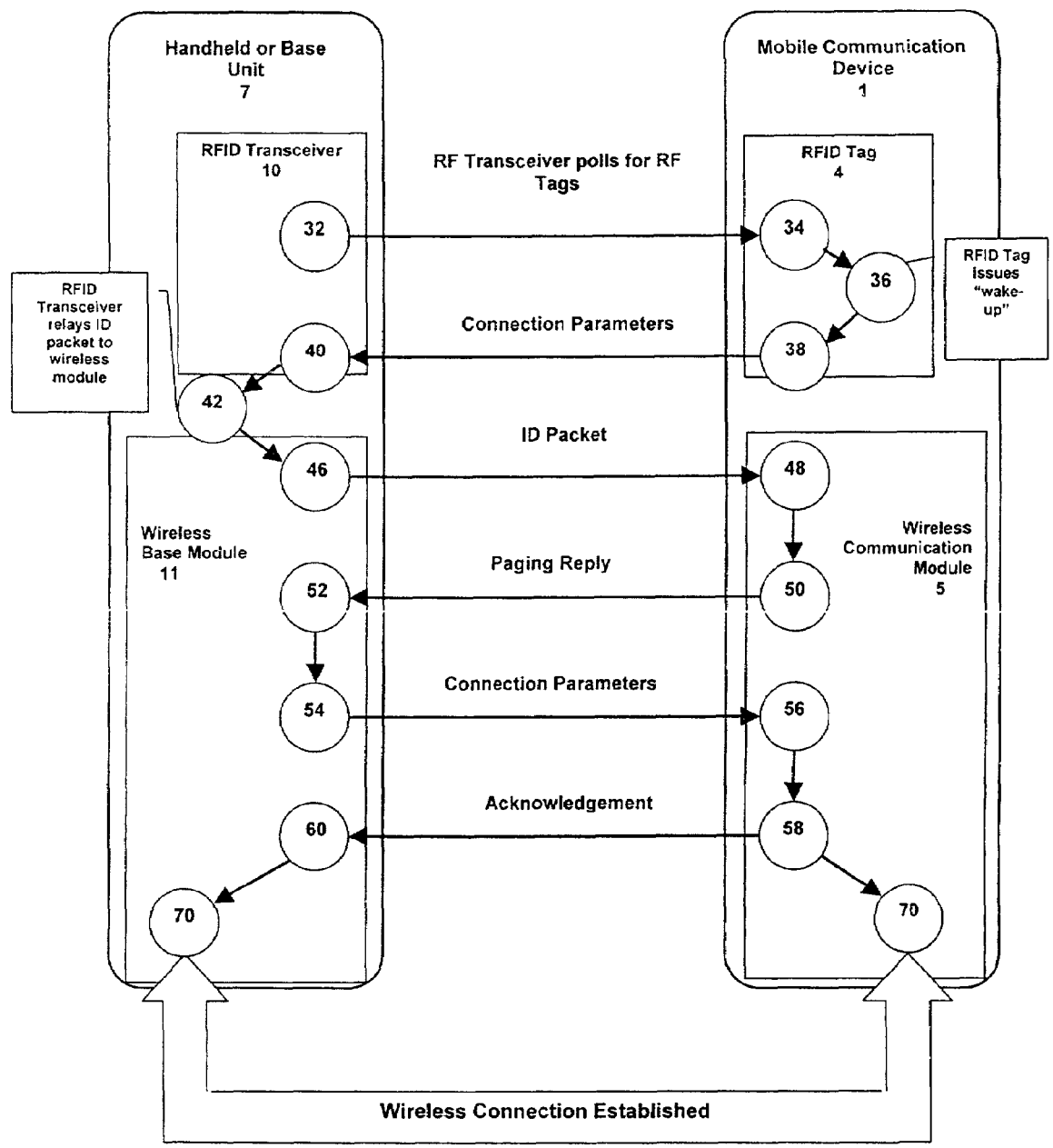
FIG. 4 is a flowchart of the method of RFID inquiry, wireless device wake-up, and authentication used to establish a wireless communication link in FIG. 3.

A method according to the present invention for establishing the wireless communication 18 shown in the block diagram of FIG. 3 is illustrated by the flowchart in FIG. 4. The method includes an RFID inquiry and device authentication module used to establish the communication link. The connection is commenced when an operator of the handheld, desktop, or base unit 7 initiates an inquiry for any compatible devices in the vicinity (1–100 meters) via a software-enabled GUI and/or keyboard interface or other similar interfaces. The RFID transceiver 10 on the base unit (e.g., handheld, desktop, etc.) then polls 32 for RF tags 4 and the wireless base module 11 for the base unit enters either an inquiry scanning or a paging mode. When an RFID tag 4 of a mobile communication device 1 receives 34 the poll 32, the tag 4 issues a "wake-up" 36 to the wireless communication module 5 on the mobile communication device 1 causing the wireless communication module 11 for the base unit 7 to enter a scanning mode. At this point, any of three variations of wireless connection establishment are possible depending on circumstances.

A first embodiment follows each of the steps listed in the flowchart in FIG. 4. Thus, following the "wake-up" 36 issued by the RFID tag 4 to the wireless communication module 5, the tag 4 also replies with a set of connection parameters 38 to the RFID transceiver 10. The connection parameters may include information such as the address of the wireless communication module 5 in the mobile communication device 1. When the RFID transceiver 10 receives the connection parameters 40, it relays the connection parameters 42 to the wireless module 11. In this way, the wireless base module 11 identifies the particular mobile communication device 1 with which a communication link is to be established. This skips the several second protocol (e.g., 10 or more seconds for connecting) that is used in establishing communication links between wireless modules. In other words, the connection parameters enable the inquiry process to be bypassed.

Using connection parameters that are provided by an RFID module is different than using pre-addressed requests. In a wireless local area network (LAN) or similar fixed wireless connection system, the network clients are known in advance and so the addressing is pre-set. In the present system, it is not known in advance which wireless devices will be in a position to communicate. The base module does not know which mobile devices will come within communication range, so waking a device and sending connection parameters is valuable because it reduces the connection time.

Further, the wireless base module 11 that is already in paging mode sends the device specific connection parameters 46 in an identification packet to the wireless communication module 5 that is already in scanning mode. When the wireless communication module 5 receives the device specific connection parameters packet 48, it returns a wireless paging reply 50. Upon reception of the wireless paging reply 52, the wireless module 11 sends back a connection parameters packet 54. After the connection parameters packet is received 56 by the wireless communication module 5, the module 5 sends a wireless acknowledgment 58. When the wireless acknowledgement is received 60, a full wireless connection is established 70 and information can be communicated between the devices. This embodiment just described conserves power by allowing the wireless module to stay in a powered-off or shutdown mode until awakened. Time is also saved by skipping the one or more second wireless connection protocol or inquiry/discovery delay.

A second embodiment is possible where following the transmission of the connection parameters packet 38, the RFID transceiver 10 either does not receive the packet or receives a corrupted transmission. After a preset time and following more attempts at polling 32 for RF tag(s) 4, the wireless base module 11 assumes that the mobile wireless module 5 has been "wakened" 36. In this case, the wireless base module is already in inquiry scanning mode and it establishes a connection using standard wireless connection protocols. This embodiment reduces battery consumption but not necessarily connection time.

A third embodiment can be implemented to utilize standard wireless connection protocols. This embodiment uses the "wake-up" 36 issued by the RFID tag 4 merely to conserve power. Following the "wake-up" 36, both wireless modules (module 11 and module 5) enter inquiry mode and inquiry scanning mode respectively, and the connection is established via a standard wireless connection protocol without using RFID supplied connection parameters. This third embodiment requires more time to establish a connection. Hence, the length of time required to create the connection may be problematic if the units move out of range before a connection is complete. This embodiment still conserves power since it utilizes the "wake up" 36.

Figure 5:
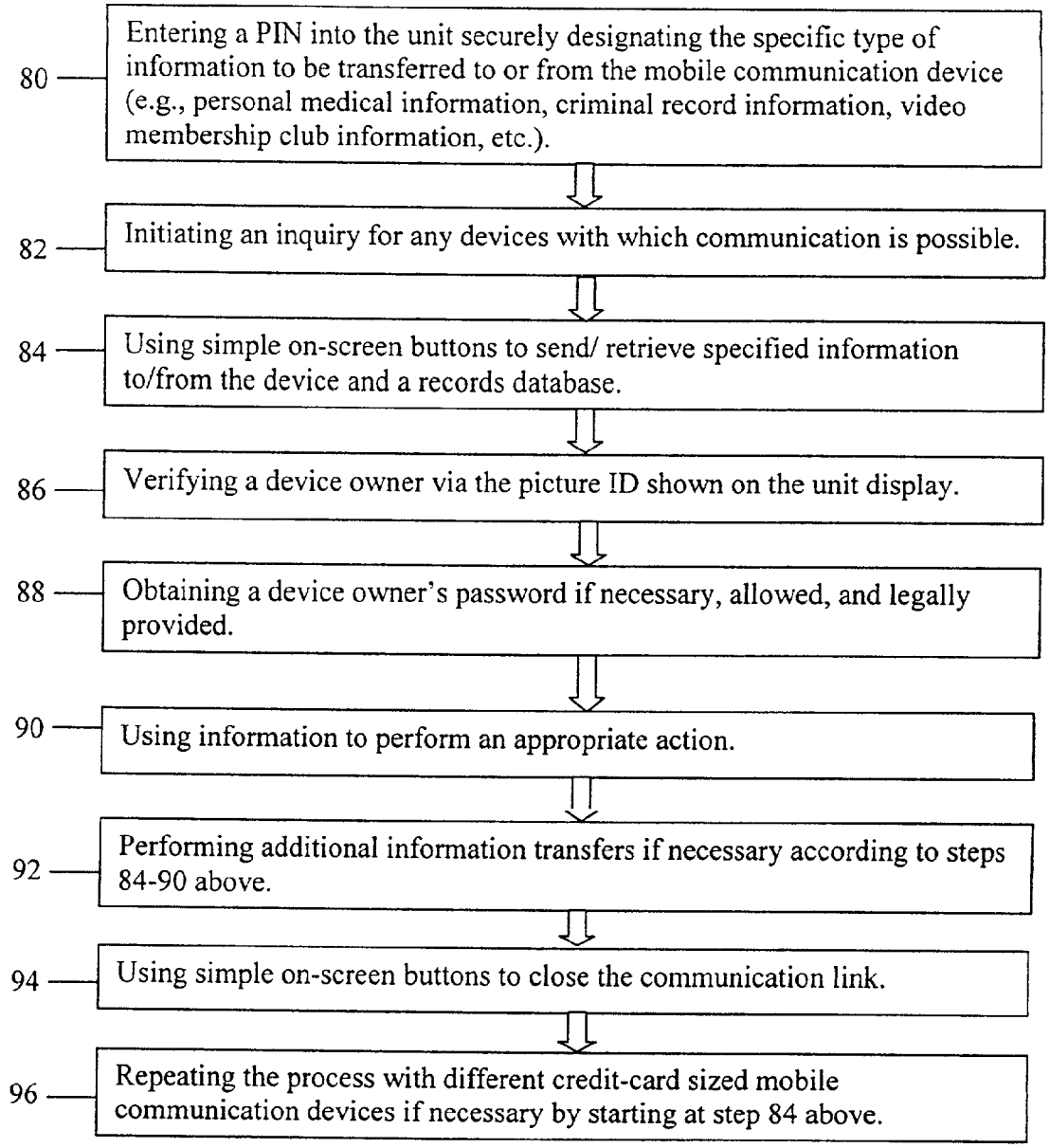
FIG. 5 is a flowchart of the method for operational control of the application software of the handheld, desktop, or base unit.

A method for control of the wireless communication with the handheld or base unit 7 by the application software is illustrated by the flowchart of FIG. 5. When communicating information, an operator enters a PIN into the handheld or desktop unit via a GUI and/or keyboard interface (or similar interface). The PIN entry 80 securely designates the specific type of information to be transferred to and/or from the mobile communication device 1. The PIN is used for security purposes and to access preset categories of information in order to maintain transactional uniformity. Next, the operator commences to initiate an inquiry 82 for mobile communication devices 1 within range and with which communication is possible. This inquiry sets in motion the detailed processes described previously and allows a wireless connection to be established. As mentioned, the mobile communication devices can be credit card sized or smaller.

Once a wireless connection is established, the operator uses simple on-screen buttons to send and/or retrieve specified information to/from 84 an appropriate device and a records database via wireless communication. One information element that can be transferred through the full wireless communication connection is a picture ID, or similar unique identifier. The operator verifies a device owner/carrier via the picture ID or similar unique identifier shown on the unit display 86. If necessary, allowed, and legally provided, the operator also obtains a device owner's password 88. The operator uses the transferred information to perform an appropriate action 90 (such as entering information FIG. 6A, updating/retrieving information FIG. 6B, or changing password protections FIG. 6C). If additional information transfers are necessary 92, the operator performs them according to steps 84–90 above. When all transactions with the particular mobile communication device are completed, the operator can use the on-screen buttons to close 94 the communication link 18 (FIG. 3). Additional information transfers can be executed with mobile communication devices with which an inquiry has been initiated (as in steps 80–82 above). To execute the additional information transfers, the operator repeats the above described process 96 with different mobile communication devices by starting at step 84.

Figures 6A, 6B, 6C:
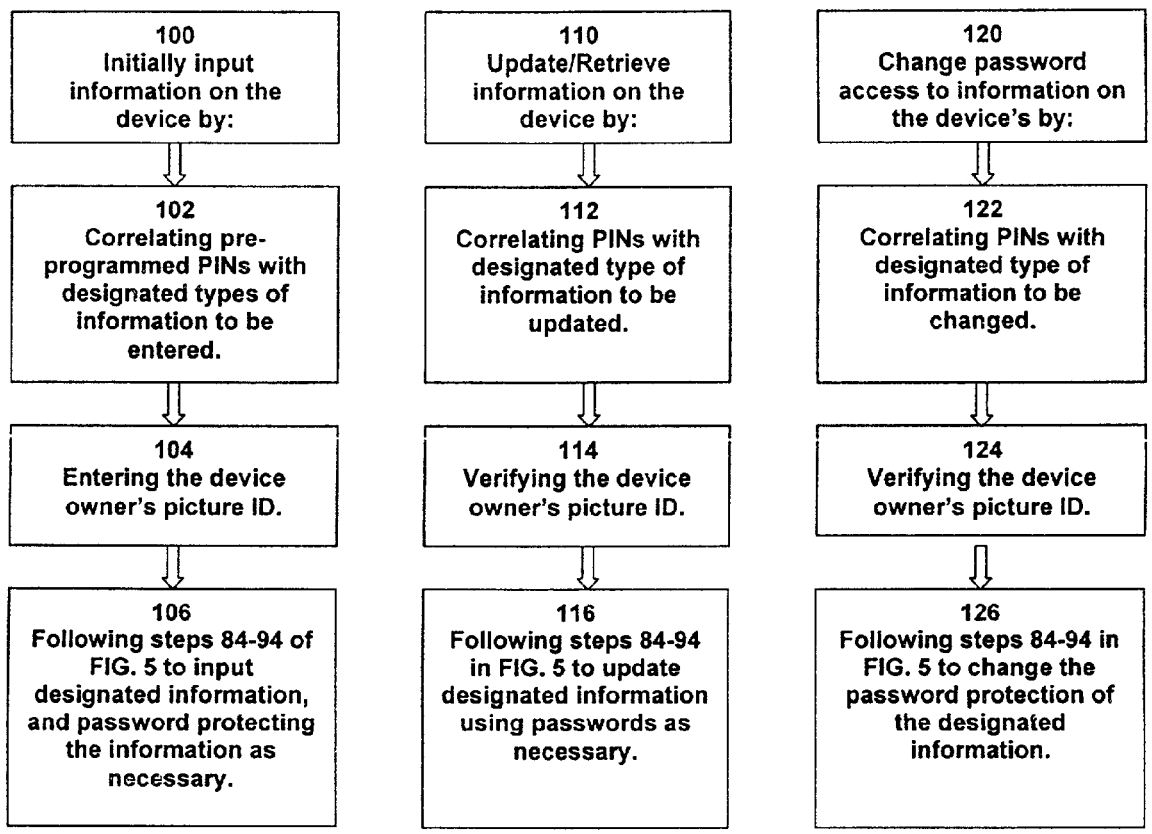
FIGS. 6A–6C are flowcharts of example software functions in an embodiment of the mobile communication device.

FIGS. 6A–6C are flowcharts illustrating several functions provided in application software for a mobile communication device. Information transfer to/from the device usually originates with the application software 16 on a handheld or base unit (FIG. 3). Thus, following the steps in FIGS. 6A–6C, a device owner or designated operator uses the handheld or base unit to effectuate transactions with application software 19 on the mobile communication device. The device operator can initially input information 100 into the device by correlating pre-programmed PINs with designated types of information to be entered 102, entering the device owner's ID 104, and following steps 84–94 of the flowchart in FIG. 5 to input designated information, and password protect the information as necessary 106.

FIG. 6B illustrates that the operator can also update and/or retrieve information 110 to/from the device by correlating PINs with designated types of information to be updated 112. Then the device owner's picture ID or other unique identifier 114 can be verified. A further step is following steps 84–94 of the flowchart in FIG. 5 to update designated information, using passwords as necessary 116. Additionally, the owner/operator can change password access to information 120 on the device, as in FIG. 6C by correlating PINs with designated types of information to be changed 122. Next, the device owner's ID or other unique identifier 124 can be verified. To complete the process, steps 84–94 of the flowchart in FIG. 5 are followed to change the password protection of the designated information 126.

A more specific example embodiment of this system and method will now be discussed. A mobile communication device can be used to store medical information about a specific individual. The mobile communication device can include a smart card with a memory, which is coupled with a Bluetooth radio, an RFID module, battery and microcontroller. This allows an individual to carry the smart card in their wallet or purse because it is typically credit-card sized or smaller and the card electronically stores all of their personal medical history. In the case of a medical emergency, the medical history is accessed by medical personnel using a base unit that may be a handheld PDA or a laptop computer in an emergency vehicle. This access can take place at the scene of an accident or upon arrival at a hospital.

As discussed previously, the radio is in a deactivated or shutdown mode to conserve power and to extend the battery life of the smart card. When the medical data is needed, the RFID module or tag is used to wake up the Bluetooth radio and the medical information can be transmitted to the medical personnel. This medical information may include the patient's picture, name or other unique identifying information, and significant medical information such as allergies or other conditions will be communicated. This provides an effective method to communicate medical information from an accident victim to emergency medical personnel or paramedics in an emergency situation without interrogating or moving the victim. Using the RFID module also enables a reduction in the connection establishment time.

There are also additional areas where the present invention can be applied. Applications where individual users carry information that is specific to them or some asset they own are foreseeable embodiments. For example, individual users can have their driving record and information about their personal vehicles stored on a credit-card sized device as described. This enables law enforcement with the appropriate password to immediately access this information about a driver. Such a card can also be used to track criminal records, identify vehicle or container contents and movements, or serve as a wireless library card or video club membership for an individual. Alternatively, the card can act as a time card and store the number of hours worked by an individual at an employment location. The card of the present invention could also be used to identify inanimate objects and store a significant amount of information or properties about that object. The card can also act as a transfer or recording document for shipping, manufacturing or similar applications.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth in the claims.

What is claimed is:

1. A mobile communication device for wirelessly transferring information to and from a base unit, comprising:
   (a) an RFID module to receive a wake-up communication from the base unit and send connection parameters back to the base unit;
   (b) a wireless communication module which is responsive to the connection parameters received from the base unit, and remains in a shutdown state with only a clock running until the RFID module receives the wake-up communication from the base unit and enables a microcontroller to wake-up the wireless communication module;
   (c) wherein the microcontroller is coupled between the RFID module and the wireless communication module to wake up the wireless communication module when the RFID module receives the wake-up communication from the base unit; and
   (d) wherein the connection parameters have an address of the wireless communication module transmitted by the RFID module to enable an inquiry period to be bypassed when the base unit connects to the wireless communication module.

2. A device as in claim 1, wherein the connection parameters transmitted by the RFID module enable a reduction of an inquiry period by at least one second.

3. A device as in claim 1, further comprising a memory module to store information about a person who is carrying the mobile communication device.

4. A device as in claim 3, wherein the memory module stores medical record information for the person who is carrying the mobile communication device.

5. A device as in claim 4, wherein medical personnel can query the mobile communication device and download medical record information using the base unit.

6. A device as in claim 1, wherein the mobile communication device is approximately the size of a credit-card or smaller.

7. A device as in claim 1, further comprising a battery to power the mobile communication device.

8. A device as in claim 1, wherein the wireless communication module is a Bluetooth radio.

9. A device as in claim 1, wherein the RFID module is a passive RFID tag.

10. A method for wireless data transmission from a wireless communication device to a base unit, comprising the steps of:
connecting to the wireless communication device that is carried on an individual's person and is sized to be equal to or smaller than a credit-card; and
transmitting personal medical information about the individual and an electronic identification image of the individual from the wireless communication device that is carried on the individual's person to the base unit for medical personnel wherein the wireless communication device remains in a shutdown state with only a clock running until a RFID module receives a wake-up communication from the base unit and enables a microcontroller to wake-up the wireless communication module.

11. A method in accordance with claim 10, farther comprising the step of waking the wireless communications device that is in a shutdown mode in order to conserve power.

12. A method in accordance with claim 11, wherein the step of waking the wireless communications device further comprises the step of waking the wireless device using an RFID device.

13. A method as in claim 12, wherein the step of connecting to the wireless communication device further comprises the step of connecting to the wireless communication device using connection parameters received from the RFID device.

14. A method as in claim 10, further comprising the step of transmitting the information about the person at a medium range of between 1 meter and 100 meters.

15. A method as in claim 10, further comprising the step of transmitting personal medical information about the individual from the wireless communication device that is carried on the individual's person.

16. A method as in claim 10, further comprising the step of sizing the wireless communication device as a substantially credit-card sized or smaller device.

17. A method for wireless communication of data, comprising the steps of:
sending an RFID signal from a base unit to an RFID module in a wireless communication device;
responding with connection parameters having an address of the wireless communication device from the RFID module;
receiving the connection parameters in the base unit;
waking up a wireless communication module using the RFID module, and the wireless communication module is responsive to connection parameters received from the base unit; wherein the wireless communication module remains in a shutdown state
with only a clock running until the RFID module receives a wake-up communication from the base unit and enables a microcontroller to wake-up the wireless communication module;
setting up a connection between the base unit and the wireless communication module using the connection parameters which enables an inquiry period to be bypassed when the base unit connects to the wireless communication module;
transmitting data stored in a memory with the wireless communication device to the base unit.

18. A method as in claim 17, wherein the step of transmitting data stored in a memory further comprises the step of transmitting information stored in the memory about a person who is carrying the mobile communication device.

19. A method as in claim 17, wherein the step of transmitting data stored in a memory further comprises the step of transmitting personal medical information from the memory about a person who is carrying the mobile communication device.

20. A method as in claim 17, farther comprising the step of sizing the mobile communication device as a substantially credit-card sized or smaller device.

21. A method for wireless communication of data, comprising the steps of:
sending a generalized RFID wakeup signal from a base unit to any RFID module of a wireless communication device within range of the base unit;
waking up at least one wireless communication module in the wireless communication device via the RFID module using the generalized RFID wakeup signal;
wherein the wireless communication module remains in a shutdown state with only a clock running until the RFID module receives a wake-up communication from the base unit and enables a microcontroller to wake-up the wireless communication module;
setting up a connection between the base unit and the wireless communication module using connection parameters;
transmitting data stored in a memory of the wireless communication device to the base unit.

22. A method as in claim 21, wherein the step of transmitting data stored in a memory further comprises the step of transmitting medical information stored in the memory about a person who is carrying the mobile communication device.

23. A method as in claim 21, further comprising the step of sizing the mobile communication device as a substantially credit-card sized or smaller device.

* * * * *